United States Patent
Ahmed et al.

(10) Patent No.: US 8,599,933 B2
(45) Date of Patent: Dec. 3, 2013

(54) ROBUST PID FILTERING FOR DVB-H

(75) Inventors: Elsayed Ahmed, Cairo (EG); Nabil Yousef, Foothill Ranch, CA (US)

(73) Assignee: Newport Media, Inc., Lake Forest, CA (US)

(*) Notice: Subject to any disclaimer, the term of this patent is extended or adjusted under 35 U.S.C. 154(b) by 1396 days.

(21) Appl. No.: 11/924,628

(22) Filed: Oct. 26, 2007

(65) Prior Publication Data
US 2009/0110082 A1    Apr. 30, 2009

(51) Int. Cl.
H04N 7/12 (2006.01)
H04N 11/02 (2006.01)
H04N 11/04 (2006.01)

(52) U.S. Cl.
USPC .................................... 375/240.27

(58) Field of Classification Search
USPC .................................... 375/240.27
See application file for complete search history.

(56) References Cited

U.S. PATENT DOCUMENTS

| | | | | |
|---|---|---|---|---|
| 5,920,572 A * | 7/1999 | Washington et al. | ......... | 370/535 |
| 7,996,482 B1 * | 8/2011 | Evans et al. | .................. | 709/212 |
| 8,326,291 B2 * | 12/2012 | Seo et al. | ...................... | 455/434 |
| 2002/0128823 A1 * | 9/2002 | Kovacevic | .................... | 704/201 |
| 2006/0135167 A1 * | 6/2006 | Wybenga et al. | ............. | 455/445 |
| 2008/0240093 A1 * | 10/2008 | Morad et al. | .................. | 370/389 |

* cited by examiner

*Primary Examiner* — Huy D Vu
*Assistant Examiner* — Adnan Baig
(74) *Attorney, Agent, or Firm* — Rahman LLC

(57) ABSTRACT

One embodiment provides a method of performing packet identifier (PID) filtering of a digital video broadcasting-handheld (DVB-H) transport stream and includes processing a PID and a continuity counter (CC) sequence of the DVB-H transport stream, computing a number of mismatched bits between the PID and a desired PID, proceeding to a start of a reset state on a first-in-first-out (FIFO) queue of the DVB-H transport stream when a FIFO buffer becomes full, determining if a number of mismatched bits of a first packet in the FIFO buffer is less than a first threshold value, and proceeding to a start of a run algorithm state only if the number of mismatched bits of the first packet in the FIFO buffer is less than the first threshold value and if there is a valid CC sequence that includes the first packet.

18 Claims, 19 Drawing Sheets

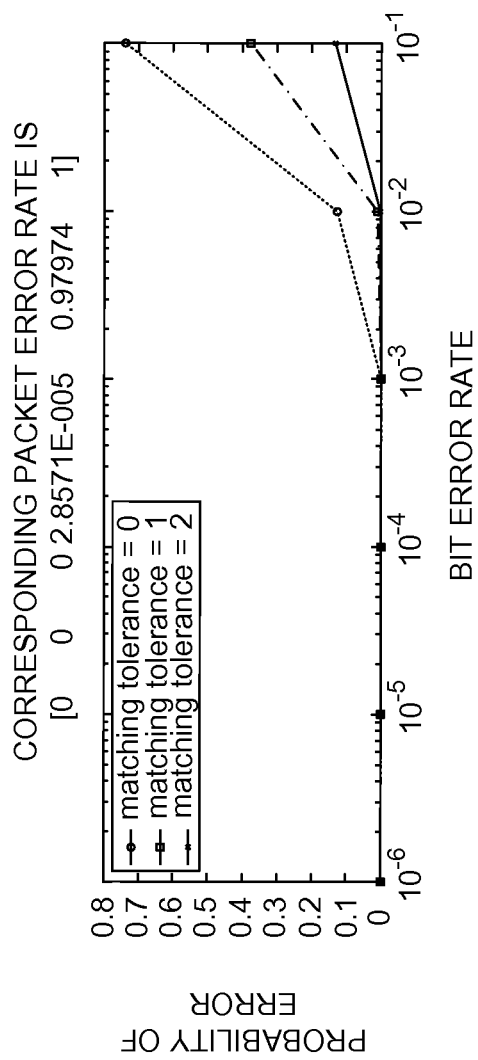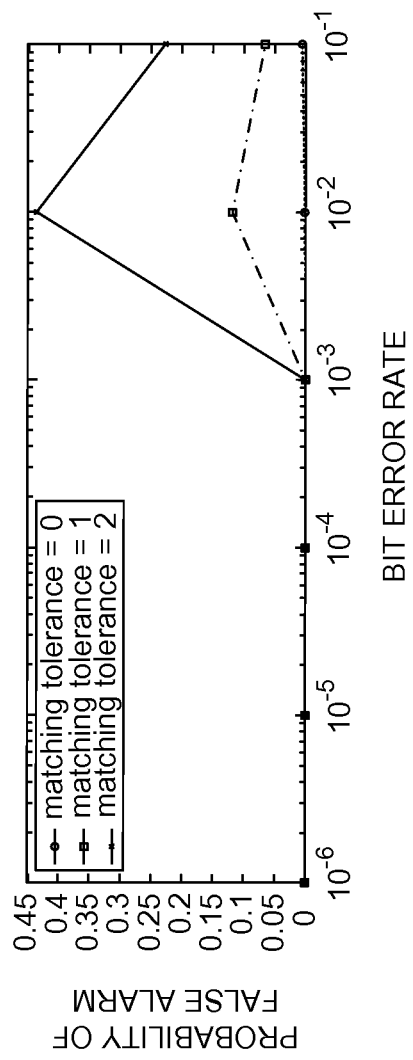
FIG. 2A
FIG. 2B

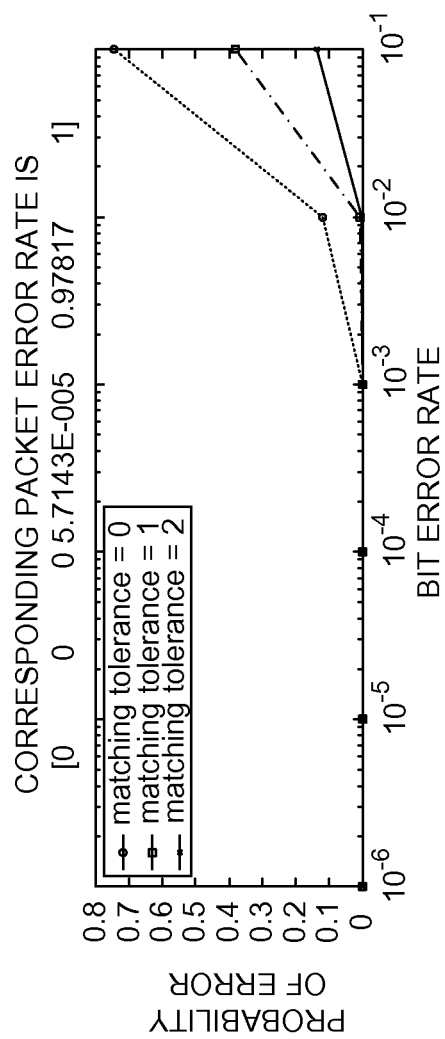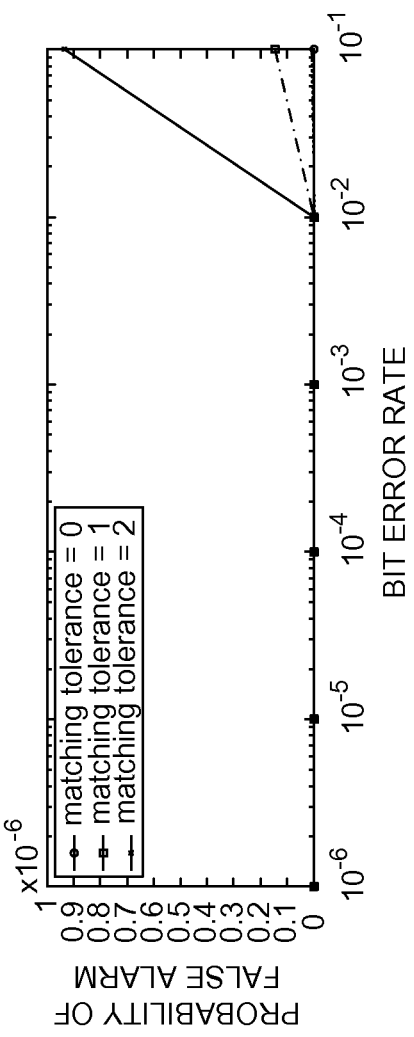

| PKT NO. | 1 | 2 | 3 | 4 | 5 | 6 | 7 | 8 | 9 | 10 | — 502 |
|---|---|---|---|---|---|---|---|---|---|---|---|
| NO. OF MISMATCHED BITS IN THE PID FIELD | 0 | 1 | 3 | 1 | 0 | 0 | 0 | 1 | 0 | 0 | — 504 |
| CONTINUITY COUNTER (CC) | 0 | 1 | 2 | 3 | 4 | 5 | 6 | 7 | 8 | 9 | — 506 |

FIG. 5A

| PKT NO. | 1 | 2 | 3 | 4 | 5 | 6 | 7 | 8 | 9 | 10 | — 502 |
|---|---|---|---|---|---|---|---|---|---|---|---|
| NO. OF MISMATCHED BITS IN THE PID FIELD | 0 | 1 | 3 | 1 | 0 | 0 | 0 | 1 | 0 | 0 | — 504 |
| CONTINUITY | 0 | 1 | 5 | 3 | 4 | 5 | 6 | 7 | 8 | 9 | — 506 |

FIG. 5B

| PKT NO. | 1 | 2 | 3 | 4 | 5 | 6 | 7 | 8 | 9 | 10 | — 502 |
|---|---|---|---|---|---|---|---|---|---|---|---|
| NO. OF MISMATCHED BITS IN THE PID FIELD | 0 | 1 | 3 | 1 | 0 | 0 | 0 | 1 | 0 | 0 | — 504 |
| CONTINUITY COUNTER (CC) | 0 | 1 | 5 | 2 | 3 | 4 | 5 | 6 | 7 | 8 | — 506 |

FIG. 5C

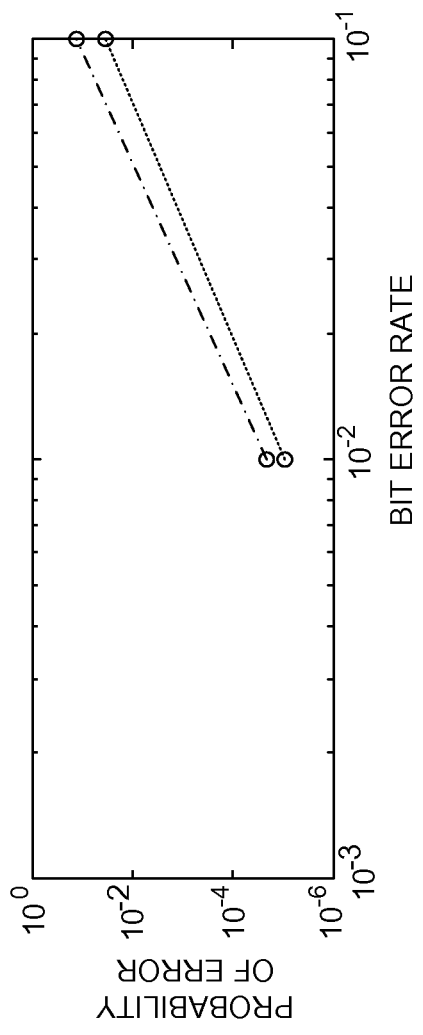
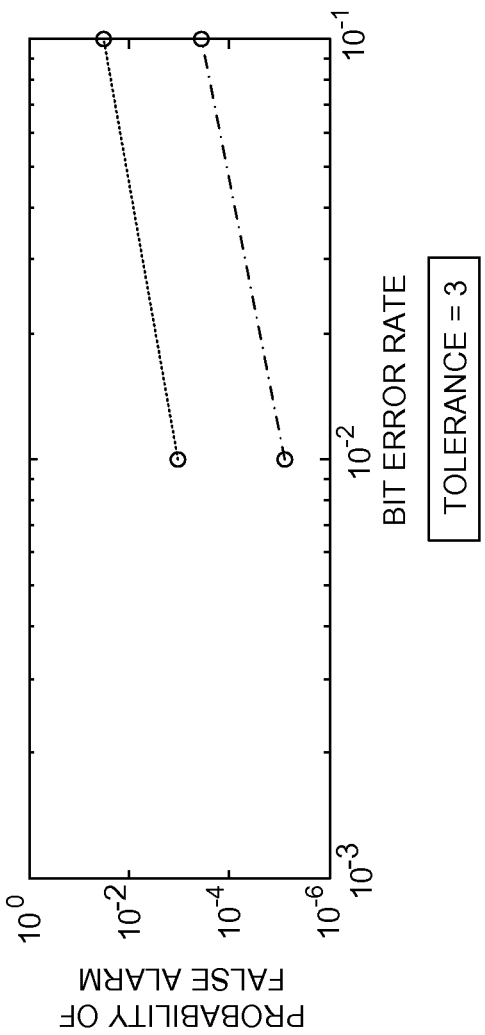
FIG. 12A
FIG. 12B

ROBUST PID FILTERING FOR DVB-H

BACKGROUND

1. Technical Field

The embodiments herein generally relate to digital video broadcasting and, more particularly to robust packet identifier (PID) filtering in digital video broadcasting.

2. Description of the Related Art

Digital Video Broadcasting-Handheld (DVB-H) is a technical specification for bringing broadcast services to handheld receivers, terrestrial television (TV), portable TVs, mobile phones, and other such mobile terminals. DVB-H can offer a downstream channel at high data rates to be used as standalone or as an enhancement of mobile telecommunication networks for typical handheld terminals. DVB-H systems are characterized by Multi-Protocol Encapsulation-Forward Error Correction (MPE-FEC), which is an additional error correction coding for Internet Protocol (IP) packets. Video programs are received in the form of messages called IP datagrams, which are transmitted as data bursts in small time slots. Each IP datagram contains a specific set of fields in a specific order so that the reader knows how to decode and read the stream of data received.

A Reed-Solomon (RS) code is an error-correcting code that works by oversampling a polynomial constructed from the data. So long as many of the data points are received correctly the receiver can recover the original polynomial even in the presence of a few bad points. The IP datagrams are collected in a 191×N matrix (e.g., N=256, 512, 768, or 1024) and are used to construct a MPE-FEC table. FIG. 1A is a schematic diagram illustrating a MPE-FEC table 100. The MPE-FEC table 100 includes an MPE frame 102 and a FEC frame 104. The MPE frame 102 includes an IP header 104 and IP data 106. Each row is appended by 64 bytes by applying (255, 191) Reed-Solomon code. If the number of IP datagrams is not sufficient, zero-padding columns are appended.

TS (Transport stream) is a communications protocol for audio, video, and data which is specified in MPEG-2 Part 1, Systems. MPE and FEC sections are mapped into 188-byte TS packets. FIG. 1B is a schematic diagram illustrating a data encapsulation process. FIG. 1B illustrates IP datagrams 110, sections 112, and TS packets 118. The IP datagrams 110 include an IP header 106 and an IP data 108. The sections 112 include a section header 114 and a section CRC 116. The TS packets 118 include a TS packet header 120. Each TS packet may have a 4-byte header that carries a thirteen bit PID (packet ID) to identify different services. Service Information (SI) and Program Specific Information (PSI) packets are also interleaved along with video packets.

FIG. 1C is a schematic diagram illustrating the syntax of a TS packet header 120 having a sync_byte 122, a transport_error_indicator 124, a payload_unit_start_indicator 126, a transport_priority 128, a PID 130, a transport_scrambling_control 132, an adaption_field_control 134, and a continuity_counter 136. The numerals shown above each of the fields of the TS packet header 120 represents the number of bits that constitute the respective field. The sync_byte 122 has 8 bits, and a value of 0×47. The transport_error_indicator 124 and the payload_unit_start_indicator 126 each have 1 bit. The payload_unit_start_indicator 126 is set to '1' when at least one section begins in a given TS packet, and is set to '0' when no section begins in the given TS packet. The transport_priority 128 has a single bit. The PID 130 has 13 bits and it indicates the type of data contained in the packet.

The transport_scrambling_control 132 has 2 bits, and its value is '00'. The adaption_field_control 134 has 2 bits. A value of the adaption_field_control 134 as '00' indicates a null packet, a value of '01' indicates a payload only, '10' indicates an adaption field only and '11' indicates an adaption field and payload. If the adaption_field_control 134 indicates the presence of an adaption field, its length is contained in the following ($5^{th}$) byte. The continuity_counter 136 has a 4-bit size and is incremented for each successive packet with a payload. The continuity_counter 136 takes values from '0×0' to '0×F' and wraps around. If a TS packet is being sent twice, the value of the continuity_counter 136 does not change. The continuity_counter 136 is undefined for null packets. The syntax of a datagram_section is summarized in Table 1.

TABLE 1

Syntax of datagram_section

| SYNTAX | NUMBER OF BITS | MNEMONIC |
|---|---|---|
| DATAGRAM_SECTION( ) { | | |
|   TABLE_ID | 8 | UIMSBF |
|   SECTION_SYNTAX_INDICATOR | 1 | BSLBF |
|   PRIVATE_INDICATOR | 1 | BSLBF |
|   RESERVED | 2 | BSLBF |
|   SECTION_LENGTH | 12 | UIMSBF |
|   MAC_ADDRESS_6 | 8 | UIMSBF |
|   MAC_ADDRESS_5 | 8 | UIMSBF |
|   RESERVED | 2 | BSLBF |
|   PAYLOAD_SCRAMBLING_CONTROL | 2 | BSLBF |
|   PAYLOAD_SCRAMBLING_CONTROL | 2 | BSLBF |
|   LLC_SNAP_FLAG | 1 | BSLBF |
|   CURRENT_NEXT_INDICATOR | 1 | BSLBF |
|   SECTION_NUMBER | 8 | UIMSBF |
|   LAST_SECTION_NUMBER | 8 | UIMSBF |
|   MAC_ADDRESS_4 | 8 | UIMSBF |
|   MAC_ADDRESS_3 | 8 | UIMSBF |
|   MAC_ADDRESS_2 | 8 | UIMSBF |
|   MAC_ADDRESS_1 | 8 | UIMSBF |
|   IF (LLC_SNAP_FLAG == "1") { | | |
|     LLC_SNAP ( ) | | |
|   } ELSE { | | |
|     FOR (J=0;J<N1;J++) { | | |
|       IP_DATAGRAM_DATA_BYTE | | BSLBF |
|     } | | |
|   } | | |
|   IF (SECTION_NUMBER == LAST SECTION_NUMBER) { | | |
|     FOR (J=0;J<N2;J++) { | | |
|       STUFFING_BYTE | | BSLBF |
|     } | | |
|   } | | |
|   IF (SECTION_SYNTAX_INDICATOR == "0") { | | |
|     CHECKSUM | 32 | UIMSBF |
|   } ELSE { | | |
|     CRC_32 | 32 | RPCHOF |
|   } | | |
| } | | |

The first step in constructing the MPE-FEC table at the receiving end is to extract the packets with the PID from the incoming packets that also include packets from other services and SI/PSI packets. This step is referred as PID filtering. PID filtering is generally the most important step because losing any packet or taking an extra packet may cause shifting of the data in the MPE-FEC table, which may then cause total failure in the MPE-FEC RS decoder. Typically, there are two important indicators that indicate the performance of any PID filter. The first indicator is the probability of error which indicates how many packets with PID equal to the needed (i.e., desired) PID are lost. The second indicator is the probability of a false alarm which indicates how many packets with PID not equal to the needed PID are taken with the packets.

The conventional approach for PID filtering is to match the PID field of each incoming packet with the required PID to determine whether the packet belongs to the required service. However, if there is any bit error in the PID field, the packet will be lost. The bit error rate (BER) is the ratio of error to the total number of bits. At a low BER (e.g., $10^{-2}$) the conventional approach will likely have a high probability of error. An N bit error (e.g., matching tolerance) in the incoming PID field may be allowed, which may decrease the probability of error, but only at the expense of increasing the probability of a false alarm.

FIGS. 2A and 2B illustrate the probability of error and the probability of a false alarm versus the BER at different cases of matching tolerance N=0, N=1, and N=2 when the needed PID is very close to the other PIDs. As can be seen from FIG. 2A, the probability of error for all matching tolerance values increase when the BER increase, and if one point is considered ($10^{-2}$, for example), one will find that the probability of error decreases when the matching tolerance increases, but at the expense of increasing the probability of false alarms as shown in FIG. 2B. All the packets having difference between PIDs and needed PIDs equal to the 'N' bits will be accepted even if they have errors.

FIGS. 3A and 3B illustrate the probability of error and the probability of a false alarm versus the BER at different cases N=0, N=1, and N=2 when the needed PID is far from the other PIDs, by differing from the other PIDs by 4 bits. From FIGS. 3A and 3B one may conclude that if the received PIDs are far from each other, then the probability of error and the probability of false alarms are decreased. If N=2 and there is any packet (e.g., SI/PSI packet or any other service packet) with a PID different from the needed PID by 2 bits and this packet received without errors, the algorithm will select this packet as a matched packet and this will be a false alarm. Also, if any packet arrives with errors in the PID field that makes the incoming PID differ from the needed PID by N bits, it will be false alarm. Clearly, PID filtering is essential in wireless digital video broadcasting, accordingly, there exists a need for a technique for PID filtering to accurately construct the MPE-FEC table in a Digital Video Broadcasting transport stream.

SUMMARY

In view of the foregoing, an embodiment herein provides a method of performing PID filtering of a DVB-H transport stream and includes processing a PID and a continuity counter (CC) sequence of the DVB-H transport stream, computing a number of mismatched bits between the PID and a desired PID, proceeding to a start of a reset state on a first-in-first-out (FIFO) queue of the DVB-H transport stream when a FIFO buffer becomes full, determining if a number of mismatched bits of a first packet in the FIFO buffer is less than a first threshold value, and proceeding to a start of a run algorithm state only if the number of mismatched bits of the first packet in the FIFO buffer is less than the first threshold value and if there is a valid CC sequence that includes the first packet.

It may be determined whether there is a valid CC sequence that includes the first packet, only if the number of mismatched bits is less than the first threshold value. The first packet may be marked as mismatched. The FIFO buffer may be updated. It may return to the start of the reset state if the number of mismatched bits of the first packet in the FIFO buffer is not less than the first threshold value. It may be determined whether the packet is matched based only on the PID by comparing the number of mismatched bits in the FIFO buffer with a second threshold value. The FIFO buffer may be updated. It may return to the start of the reset state if there is no valid CC sequence. The first packet may be marked as matched. A LAST_CC value may be updated with a CC value of the first packet if there is a valid CC sequence.

In another aspect, a method of performing PID filtering of a DVB-H transport stream includes processing a PID and a CC sequence of the DVB-H transport stream, buffering a FIFO queue of the DVB-H transport stream until a FIFO buffer is full, computing a number of mismatched bits between the PID and a desired PID, proceeding to a start of a reset state when the FIFO buffer becomes full, determining if a number of mismatched bits of a first packet in the FIFO buffer is less than a first threshold value, determining if there is a valid CC sequence, if the number of mismatched bits of the first packet in the FIFO buffer is less than the first threshold value, marking the first packet as matched, updating a LAST_CC value with a CC value of the first packet, updating the FIFO buffer if there is a valid CC sequence, proceeding to a start of a run algorithm state only if the number of mismatched bits of the first packet in the FIFO buffer is less than the first threshold value and if there is a valid CC sequence, determining if a first packet in the FIFO buffer has a number of mismatched bits greater than the first threshold value, and computing a difference between a CC value of the first packet and the LAST_CC value if the first packet in the FIFO buffer has a number of mismatched bits not greater than the first threshold value.

It may be determined if the first three packets in the FIFO buffer have a valid CC sequence if the first packet in the FIFO buffer has a number of mismatched bits greater than the first threshold value. A first packet may be marked in the FIFO buffer as matched or mismatched based on whether the first three packets in the FIFO buffer have a valid CC sequence. The FIFO buffer may be updated and returned to the start of the run algorithm state. The first packet may be marked as matched. The LAST_CC value may be incremented, if the difference between the CC value of the first packet and the LAST_CC value is equal to 1. It may be determined whether there is a sequence of packets having a valid CC sequence if the difference between the CC value of the first packet and the LAST_CC value is not equal to 1. A position of a first packet may be obtained in the first sequence of packets having a valid CC sequence. A difference between a CC value of the first packet may be computed in the first sequence of packets having a valid CC sequence and a LAST_CC value if there is a sequence of packets having a valid CC sequence.

It may be determined whether the packet is matched based only on the PID by comparing the number of mismatched bits in the FIFO buffer with a second threshold value and updating the FIFO buffer if there is no valid CC sequence. It may be determined whether a packet in the FIFO buffer is matched based on the position of a first packet in the first sequence of packets having a valid CC sequence and the difference between the CC value of the first packet in the first sequence of packets having a valid CC sequence and the LAST_CC value. It may be determined whether a number of packets having a number of mismatched bits less than the first threshold value is greater than half of a size of the FIFO buffer and returned to the run algorithm state if the number of packets having the number of mismatched bits less than the first threshold value is greater than half of the size of the FIFO buffer. It may return to the reset state if the number of packets having the number of mismatched bits less than the first threshold value is not greater than half of the size of the FIFO buffer.

In yet another aspect, a mobile terminal includes a receiver component for receiving a digital video broadcast signal comprising a DVB-H transport stream, a memory component for storing the received digital video broadcast signal, a processor for performing PID filtering of the DVB-H transport stream, and a FIFO buffer for buffering the DVB-H transport stream. The processor is configured to process a PID and a CC sequence of the DVB-H transport stream. A FIFO queue of the DVB-H transport stream is buffered until the FIFO buffer is full. A number of mismatched bits is computed between the PID and a desired PID and is proceeded to a start of a reset state when the FIFO buffer becomes full. It is determined if a number of mismatched bits of a first packet in the FIFO buffer is less than a first threshold value. It is determined if there is a valid CC sequence, if the number of mismatched bits of the first packet in the FIFO buffer is less than the first threshold value, mark the first packet as matched.

A LAST_CC value is updated with a CC value of the first packet. The FIFO buffer is updated if there is a valid CC sequence and is proceeded to a start of a run algorithm state only if the number of mismatched bits of the first packet in the FIFO buffer is less than the first threshold value and if there is a valid CC sequence. It is determined if a first packet in the FIFO buffer has a number of mismatched bits greater than the first threshold value. A difference between a CC value of the first packet and the LAST_CC value is computed if the first packet in the FIFO buffer has a number of mismatched bits not greater than the first threshold value.

The processor may be configured to determine if the first three packets in the FIFO buffer have a valid CC sequence if the first packet in the FIFO buffer has a number of mismatched bits greater than the first threshold value. A first packet may be marked in the FIFO buffer as matched or mismatched based on whether the first three packets in the FIFO buffer have a valid CC sequence. The FIFO buffer may be updated and returned to the start of the run algorithm state. The processor may also be configured to mark the first packet as matched. The LAST_CC value may be incremented, if the difference between the CC value of the first packet and the LAST_CC value is equal to 1. The processor may determine whether there is a sequence of packets having a valid CC sequence if the difference between the CC value of the first packet and the LAST_CC value is not equal to 1.

A position of a first packet may be obtained in the first sequence of packets having a valid CC sequence. A difference between a CC value of the first packet may be computed in the first sequence of packets having a valid CC sequence and a LAST_CC value if there is a sequence of packets having a valid CC sequence. The processor may determine whether the packet is matched based only on the PID by comparing the number of mismatched bits in the FIFO buffer with a second threshold value and updating the FIFO buffer if there is no valid CC sequence. The processor may also determine whether the packet is matched based only on the PID by comparing the number of mismatched bits in the FIFO buffer with a second threshold value and updating the FIFO buffer if there is no valid CC sequence. The processor may determine whether the packet is matched based only on the PID by comparing the number of mismatched bits in the FIFO buffer with a second threshold value and updating the FIFO buffer if there is no valid CC sequence.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2A and 2B are graphical representations illustrating the probability of error and the probability of a false alarm versus the BER, respectively, at different cases N=0, N=1, and N=2 when the needed PID is very close to the other PIDs;

FIGS. 3A and 3B are graphical representations illustrating the probability of error and the probability of a false alarm versus the BER, respectively, at different cases N=0, N=1, and N=2 when the needed PID is far from the other PIDs;

FIGS. 5A through 5C are tables illustrating three cases of packet sequences with one packet having more than two mismatched bits in the PID field and the continuity counter belonging to the services and in correct sequence, belonging to the service but with error, and not belonging to the service and not matched, respectively, according to an embodiment herein;

FIGS. 12A and 12B are graphical representations illustrating the probability of error and the probability of a false alarm versus the BER, respectively, comparing a conventional PID filter and a PID filter according to an embodiment herein, when the difference between the needed PID and the other PIDs is four bits, and the matching tolerance=3.

DETAILED DESCRIPTION OF PREFERRED EMBODIMENTS

Figure 1A:
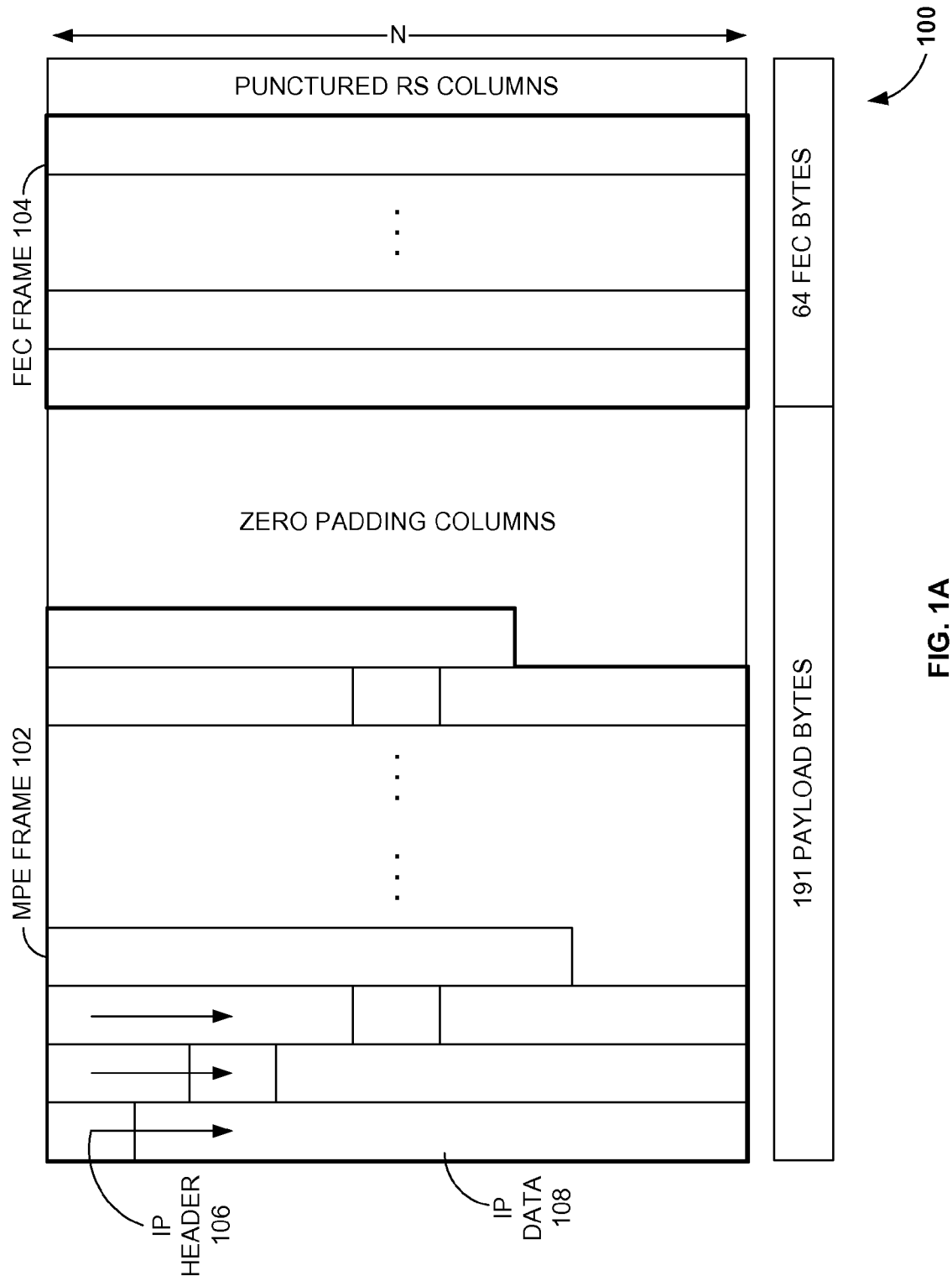
FIG. 1A is a schematic diagram illustrating a MPE-FEC table.
Figure 1B:
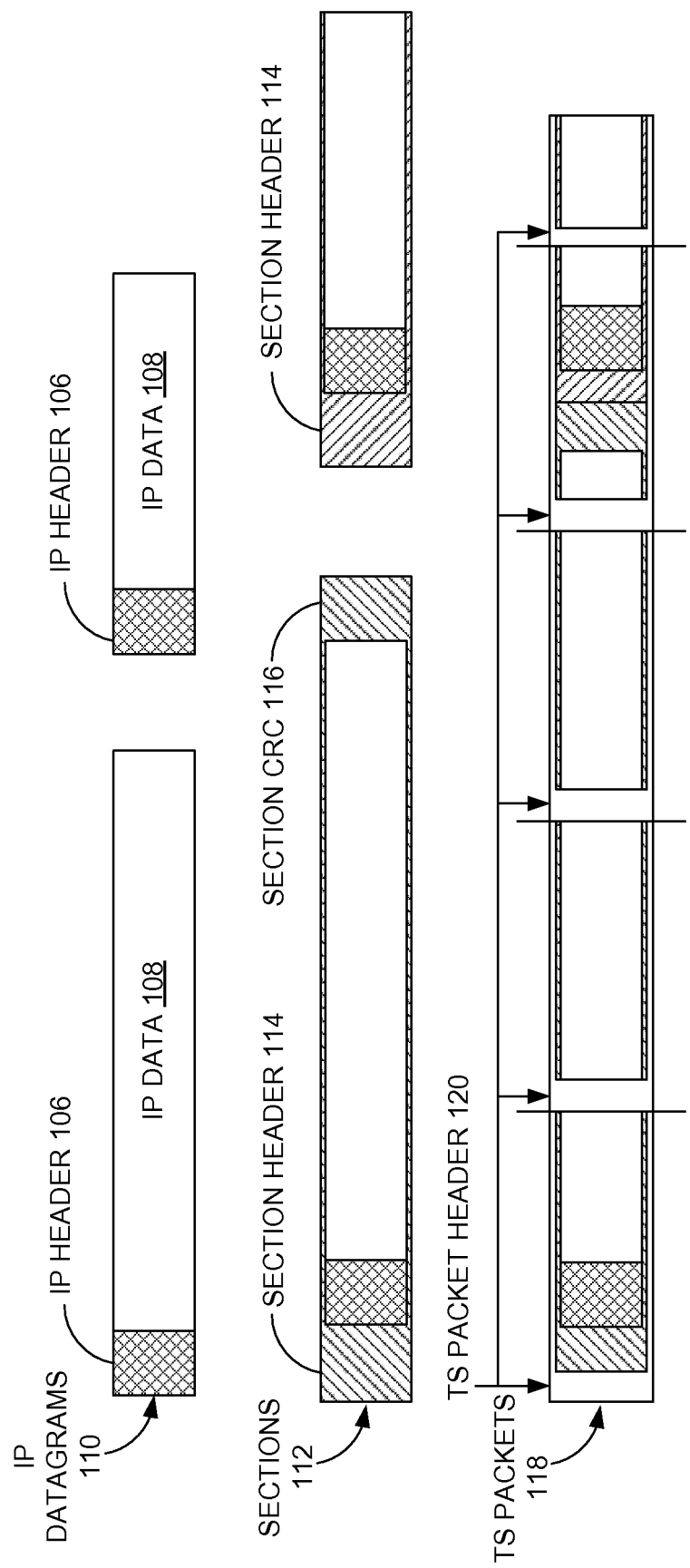
FIG. 1B is a schematic diagram illustrating a data encapsulation process.
Figure 1C:
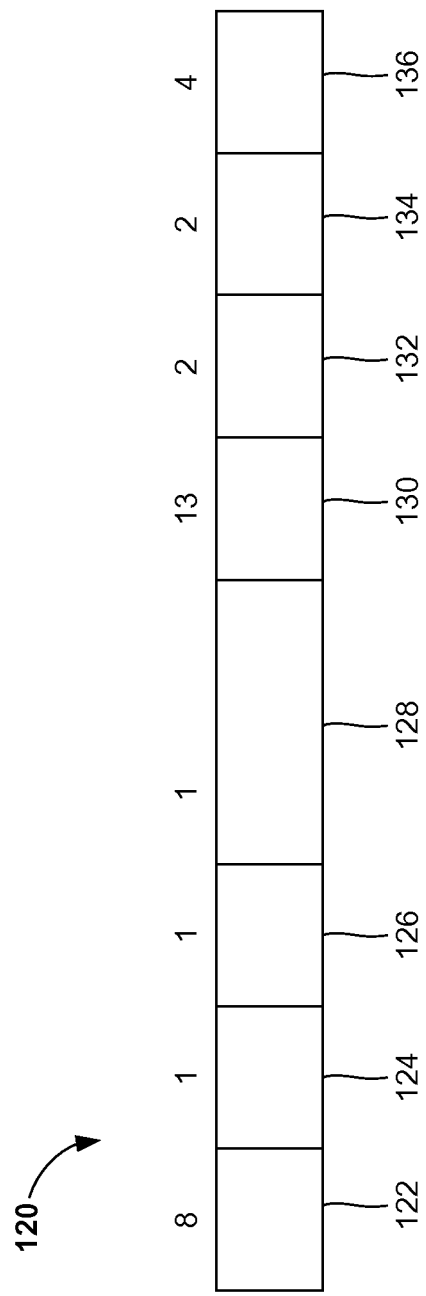
FIG. 1C is a schematic diagram illustrating the syntax of a TS packet header.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique for PID filtering to accurately construct the MPE-FEC table in a Digital Video Broadcasting transport stream. The embodiments herein achieve this by providing a method of performing PID filtering of a DVB-H transport stream that includes processing a PID and a CC sequence of the DVB-H transport stream, computing a number of mismatched bits between the PID and a desired PID, proceeding to a start of a reset state on a FIFO queue of the DVB-H transport stream when a FIFO buffer becomes full, determining if a number of mismatched bits of a first packet in the FIFO buffer is less than a first threshold value, and proceeding to a start of a run algorithm state only if the number of mismatched bits of the first packet in the FIFO buffer is less than the first threshold value and if there is a valid CC sequence that includes the first packet. Referring now to the drawings, and more particularly to FIGS. 4 through 13, where similar reference characters denote corresponding features consistently throughout the figures, there are shown preferred embodiments.

Figure 4:
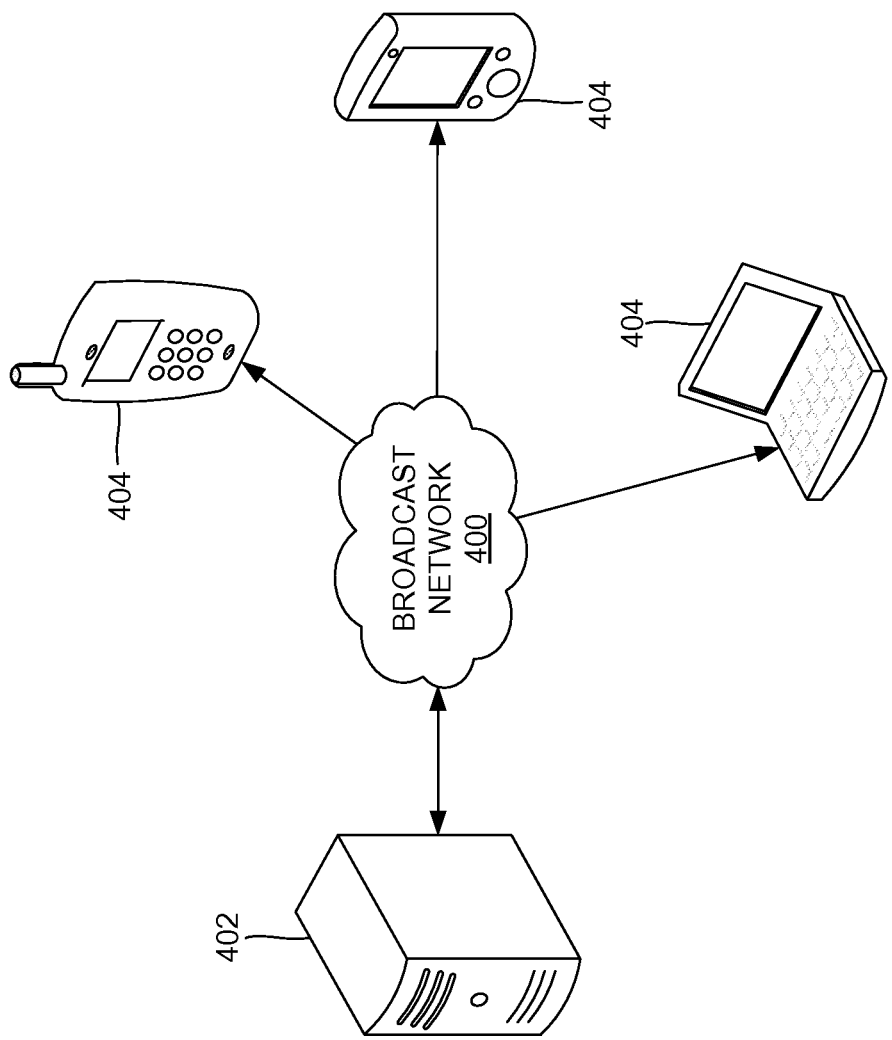
FIG. 4 is a schematic diagram illustrating a plurality of mobile terminals connecting to a digital video content server through a broadcast network according to an embodiment herein.

FIG. 4 illustrates a plurality of mobile terminals 404 connecting to a digital video content server 402 through a broadcast network 400, according to an embodiment herein. Broadcast network 400 transmits the digital content provided by digital video content server 402 as transport streams (e.g., MPEG-TS streams) to mobile terminal 404, where content and metadata may be unbundled and utilized. Broadcast network 400 may use time-sliced transmissions in order to deliver content in high-bandwidth radio bursts as opposed to transmitting a constant lower bandwidth signal. Broadcast network 400 may alternate between transmitting multiple "channels" of digital content by interleaving bursts with different content. Digital content may be created and/or provided by digital video content server 402 and may include video signals, audio signals, data etc.

There may a plurality of digital video content servers 402 (e.g., even though only one is illustrated in FIG. 4) and they may include content aggregator servers (not shown) that may provide content in the form of a service, and service delivery servers to deliver content to a users via mobile terminals 404. Service delivery servers may bundle services from content aggregator servers along with metadata about offered services and their delivery. Metadata (e.g., PSI/SI) incorporated with content in a DVB system may include a series of standardized data tables. The mobile terminal 404 may be embodied as a handheld receiver, a terrestrial TV, a portable TV, a mobile phone etc.

FIGS. 5A, 5B, and 5C are tables illustrating three cases of packet sequences with one packet having more than two mismatched bits in the PID field and the continuity counter belonging to the services and in a correct sequence, belonging to the service but with errors, and not belonging to the service and not matched, respectively. Referring to FIG. 5A, the packet number 502 has values ranging from 1 to 10. The number of mismatched bits in the PID field 504 may vary from 0 to 3, with the packet number 3 having 3 mismatched bits. The continuity counter (CC) 506 has values ranging from 0 to 9 in increments of 1, illustrating that all packets belong to the service is in the correct sequence. If the decision of whether packet 3 belongs to a desired service is taken based on the conventional approach of only matching the PID field and allowing for N=2, the outcome will be that packet does not belong to the service. However, if the continuity counter 506 is also taken into consideration, since packet 3 appears in the correct sequence the outcome of the decision would be that the packet belongs to the service.

Referring to FIG. 5B, the packet number 502 has values ranging from 1 to 10. The number of mismatched bits in the PID field 504 is the same for all packets as in FIG. 5A, and may vary from 0 to 3 with the packet number 3 having 3 mismatched bits. In this case, the continuity counter 506 of packet 3 is equal to 5, and hence does not belong to the sequence, as the correct sequential value of the continuity counter 506 of packet 3 is 2. There may be two possibilities, one in which packet 3 belongs to the service and its continuity counter 506 has errors, and the other in which packet 3 does not belong to the service (e.g., is a SI/PSI packet). Since the continuity counter 506 has a sequence of 0 1 5 3 4, it is likely that the 5 was 2 but it has become corrupted.

Hence, out of the two possibilities, the first (packet 3 belongs to the service and its continuity counter 506 has errors) is the outcome of the decision. Referring to FIG. 5C, the packet number 502 has values ranging from 1 to 10. The number of mismatched bits in the PID field 504 is the same for all packets as in FIG. 5A and FIG. 5B, and may vary from 0 to 3 with the packet number 3 having 3 mismatched bits. In this case, the continuity counter 506 of packet 3 is equal to 5. The continuity counter 506 has a sequence of 0 1 5 2 3 4, so the 5 does not belong to the sequence and so the outcome of the decision is that packet 3 does not belong to the service (e.g., is a SI/PSI packet).

Figure 6A:
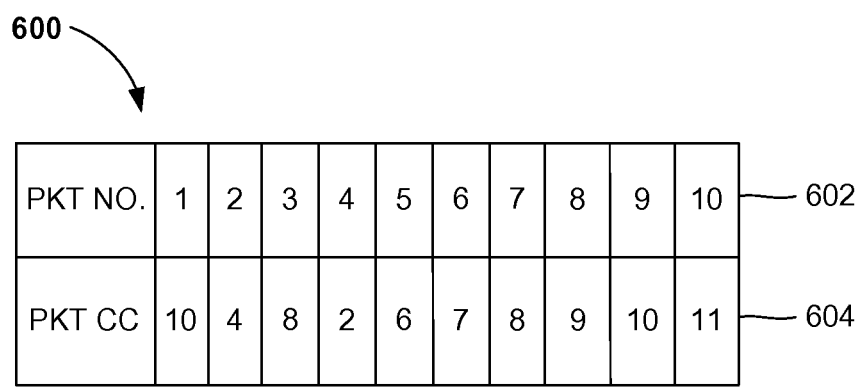
FIGS. 6A and 6B are tables illustrating the packet number and corresponding packet CC of a sequence of packets in a FIFO buffer, and a transmitted sequence, respectively, according to an embodiment herein.
Figure 6B:
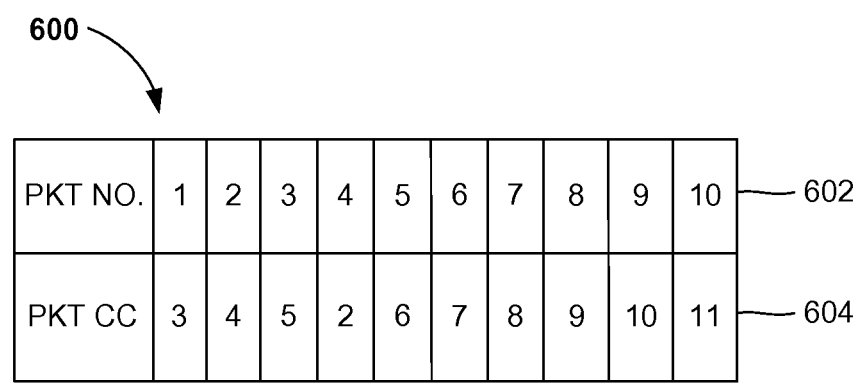

FIGS. 6A and 6B are tables illustrating the packet number 602 and corresponding packet CC 604 of a sequence of packets in a FIFO buffer 600, and a transmitted sequence, respectively. The packet number 602 has values ranging from 1 to 10, corresponding to a FIFO buffer 600 of size=10. The packet CC 604 contains the value of the corresponding continuity counter of each packet in the FIFO buffer 600. The values of the packet CC 604 of the first four packets in the FIFO buffer 600 are 10, 4, 8, and 2, respectively, as shown in FIG. 6A. The corresponding values of the packet CC 604 of the first four packets in the transmitted sequence are 3, 4, 5, and 2, respectively, as shown in FIG. 6B. The packet CC 604 of packets 5 to 10 are 6, 7, 8, 9, 10, and 11, respectively, for the FIFO buffer 600 of FIG. 6A as well as the transmitted sequence of FIG. 6B.

A register called LAST_CC contains the previous valid CC (e.g., the continuity counter of the last data packet). In one embodiment, the LAST_CC for the first packet is equal to 2. Referring to FIG. 6A, the difference between the packet CC 604 for the first packet in FIFO buffer 600 and the LAST_CC is 8 (e.g., 10−2). The first valid CC sequence starts with packet number 5, and the first valid CC sequence of N packets where N=3 are packets 5, 6, and 7 having packet CC 604 of 6, 7, and 8. Hence, the position of the first packet in a valid sequence of N packets where N=3, having a valid sequence is 5, and its corresponding value of packet CC 604 is 6. The difference between the packet CC 604 of this packet and the LAST_CC will be 4 (e.g., 6−2=4).

Figure 7A:
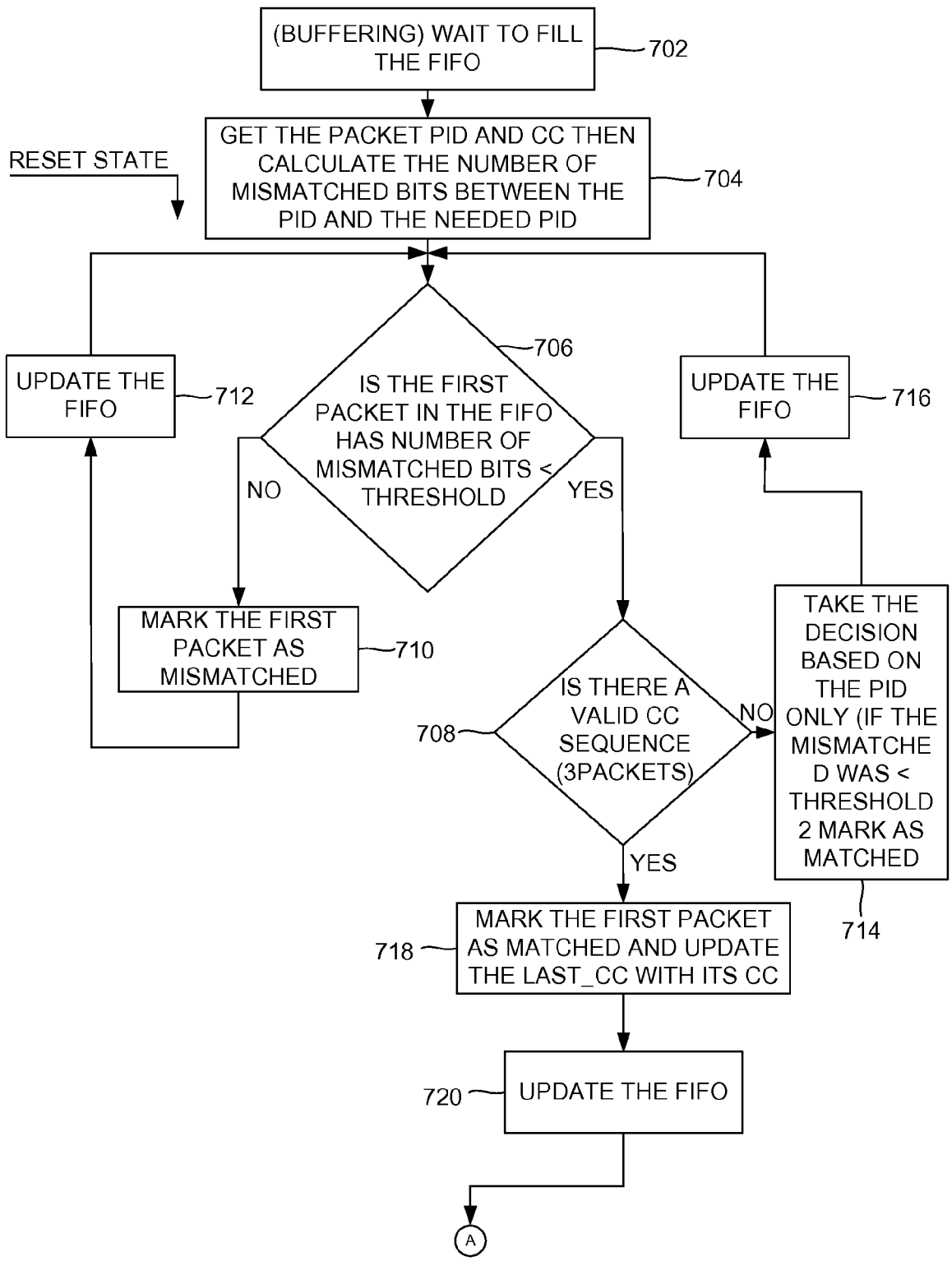
FIGS. 7A through 7E are flow diagrams illustrating a method of PID filtering of a DVB-H TS according to an embodiment herein.

FIGS. 7A, 7B, 7C, 7D, and 7E are interrelated process flow diagrams illustrating a method of PID filtering of a DVB-H TS according to an embodiment herein. Referring to FIG. 7A, in step 702, a FIFO queue of the TS is buffered (in FIFO buffer 600 of FIGS. 6A and 6B) until the FIFO buffer 600 is full. In step 704, a PID and a CC sequence of a TS is processed (e.g., at the mobile terminal 404 of FIG. 4) and a number of mismatched bits between the PID and a needed PID is calculated. In step 706, it is determined if the number of mismatched bits of a first packet in the FIFO buffer 600 (of FIGS. 6A and 6B) is less than a first threshold value, at a start of a reset state. Step 706 represents a start of a reset state, and may be proceeded to only when the FIFO buffer 600 (of FIGS. 6A and 6B) becomes full. If the number of mismatched bits of the first packet in the FIFO buffer 600 (of FIGS. 6A and 6B) is not less than the first threshold value (NO), in step 710 the first packet is marked as mismatched, in step 712 the FIFO buffer 600 (of FIGS. 6A and 6B) is updated, and the reset state is repeated. Only if the number of mismatched bits of the first packet in the FIFO buffer 600 (of FIGS. 6A and 6B) is less than the first threshold value (YES), in step 708, it may be determined if there is a valid CC sequence that includes the first packet.

If there is no valid sequence (NO), in step 714 the decision on whether the packet is matched is taken based only on the PID by comparing the number of mismatched bits in the FIFO buffer 600 (of FIGS. 6A and 6B) with a second threshold value. If the number of mismatched bits of the first packet in the FIFO buffer 600 (of FIGS. 6A and 6B) is less than the second threshold value, the packet is marked as matched, else it is marked as mismatched. Then, in step 716 the FIFO buffer 600 (of FIGS. 6A and 6B) is updated, following which the reset state is repeated from the start. If there is a valid CC sequence (YES), in step 718 the first packet is marked as matched and a LAST_CC value is updated with a CC of the first packet, and in step 720 the FIFO buffer 600 (of FIGS. 6A and 6B) is updated in a final step of the reset state. A start of a run algorithm state is proceeded to only if the number of mismatched bits of the first packet in the FIFO buffer 600 (of FIGS. 6A and 6B) is less than the first threshold value as determined in step 706 and if there is a valid CC sequence as determined in step 708.

Figure 7B:
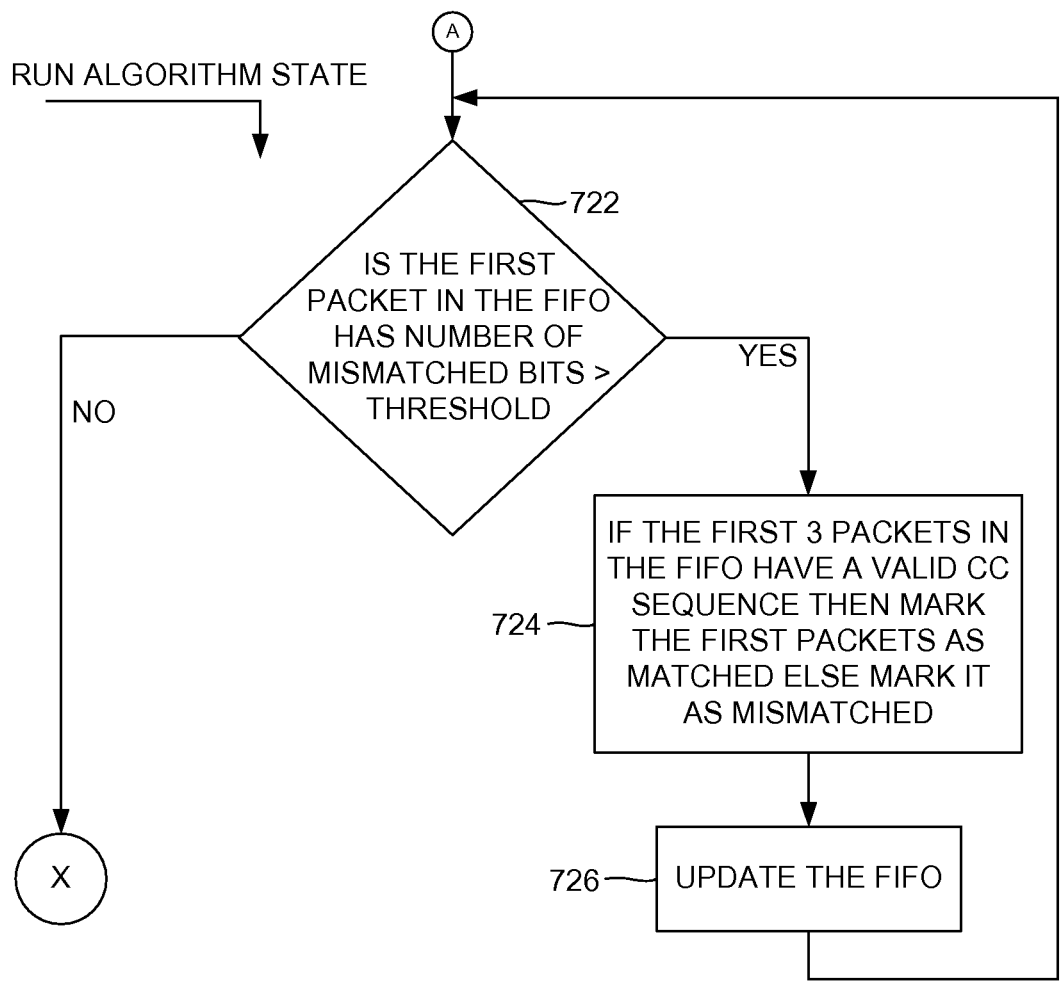

Referring to FIG. 7B, the start of the run algorithm state is in step 722, in which it may be determined if a first packet in a FIFO buffer 600 (of FIGS. 6A and 6B) has a number of mismatched bits greater than the first threshold value. If the first packet in the FIFO buffer 600 (of FIGS. 6A and 6B) has a number of mismatched bits greater than the first threshold value (YES), in step 724 it is determined if the first three packets in the FIFO buffer 600 (of FIGS. 6A and 6B) have a valid CC sequence based on which a first packet in the FIFO buffer 600 (of FIGS. 6A and 6B) is marked as matched or mismatched, in step 726 the FIFO buffer 600 (of FIGS. 6A and 6B) is updated and the start of the run algorithm state is returned to (e.g., the run algorithm state is repeated).

Figure 7C:
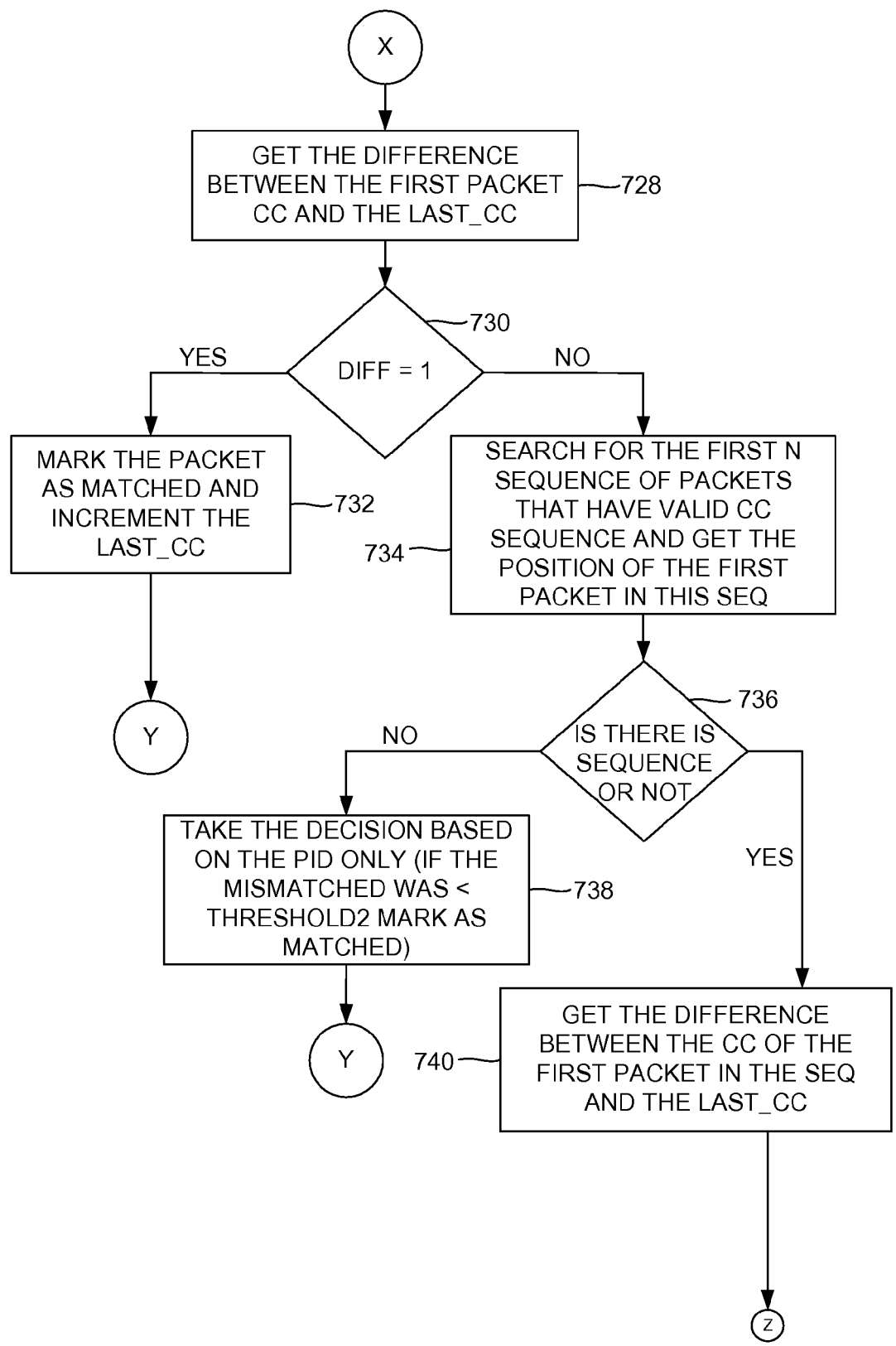

If the first packet in the FIFO buffer 600 (of FIGS. 6A and 6B) has a number of mismatched bits not greater than the first threshold value as determined in step 722 (NO), a difference between a CC of the first packet and a LAST_CC is computed in step 728 of FIG. 7C. If the difference between the CC of the first packet and the LAST_CC is equal to 1 as determined in step 730 (YES), the first packet is marked as matched and the LAST_CC is incremented in step 732. If the difference between the CC of the first packet and the LAST_CC is not equal to 1 (NO), in step 734 a search is conducted for the first N sequence of packets that have a valid CC sequence and the position of the first packet in this sequence is obtained.

In step 736, it is determined if there is a sequence of packets having a valid CC sequence. If there is no valid CC sequence (NO), in step 738 a decision on whether the packet is matched is made based only on the PID by comparing the number of mismatched bits in the FIFO buffer 600 (of FIGS. 6A and 6B) with a second threshold value. If there is a sequence of packets having a valid CC sequence (YES), in step 740 a difference between a CC of the first packet in the first sequence of packets having a valid CC sequence and a LAST_CC is computed.

Figure 7D:
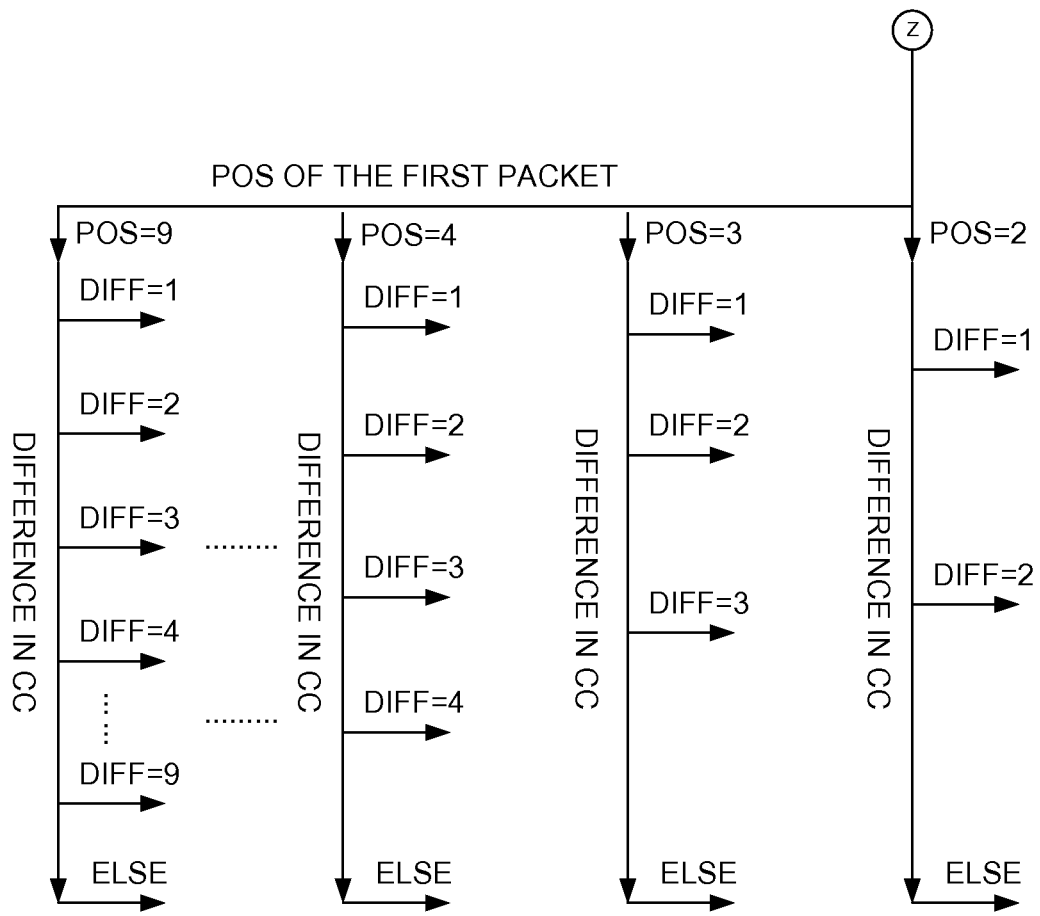
Figure 7E:
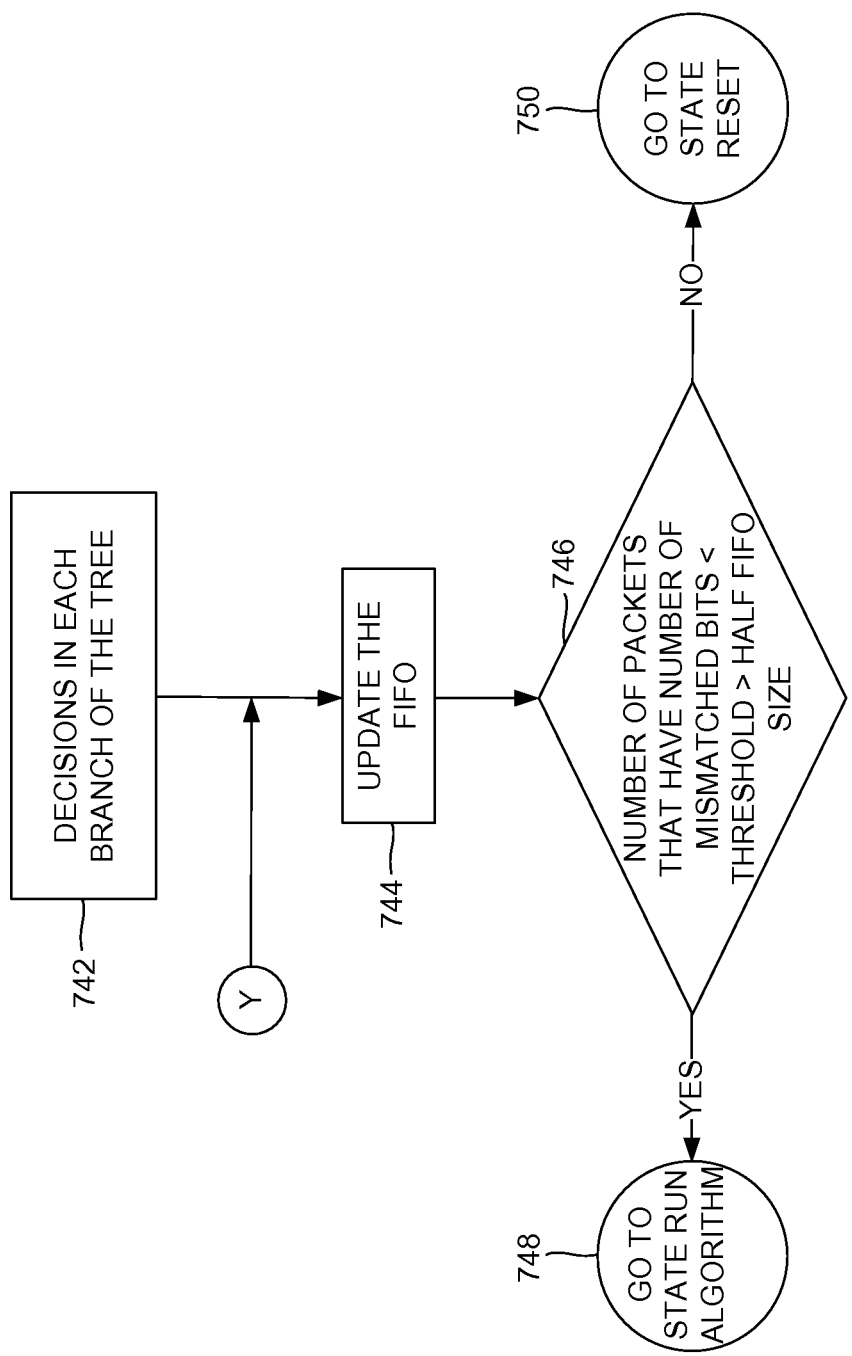

FIG. 7D illustrates cases of various values of the position of the first packet in the first sequence of packets having a valid CC sequence and the difference between the CC of the first packet in the first sequence of packets having a valid CC sequence and the LAST_CC. In step 742 of FIG. 7E, a decision on whether a packet in the FIFO buffer 600 (of FIGS. 6A and 6B) is matched is made based on the position of the first packet in the first sequence of packets having a valid CC sequence and on the difference between the CC of the first packet in the first sequence of packets having a valid CC sequence and the LAST_CC. In the tables illustrating the packet number 602 and corresponding packet CC 604 of a sequence of packets in a FIFO buffer 600 (of FIGS. 6A and 6B), and a transmitted sequence respectively as illustrated in FIGS. 6A and 6B according to one embodiment, the position of the first packet in the sequence (e.g., Pos) is 5 so there are 4 packets before this packet. As the difference in the CC between the first packet in the sequence and the LAST_CC (e.g., Diff) is 4, it is determined that there are 3 MPE-FEC packets between the first packet in the valid sequence and the previous packet (represented by the LAST_CC).

However from the position of the first packet in the sequence there are 4 packets since the FIFO buffer 600 (of FIGS. 6A and 6B) between the first packet in the valid sequence and the previous packet (represented by the LAST_CC). Hence, one may conclude that packets from 1 to 4 in the FIFO buffer 600 (of FIGS. 6A and 6B) contain three MPE-FEC packets and one SI/PSI table packet. So, the decision is taken based on the number of mismatched bits in the PID field to extract the packet from them. It may be noted that if the difference in CC was 5 instead of 4 then all 4 packets will be MPE-FEC packets and in this case the decision that the packet is matched may be made without considering the number of mismatched bits in the PID field.

In the embodiment in which Pos=5, there are 4 packets between the previous packet (e.g., represented by LAST_CC) and the first packet in the valid sequence, corresponding to the following possible cases in which:

1—All 4 packets are SI/PSI packets.
    2—One packet is MPE-FEC packet and the other 3 are SI/PSI packets.
    3—2 packets are MPE-FEC packet and the other 2 are SI/PSI packets.
    4—3 packets are MPE-FEC packet and the other 1 is SI/PSI packets.
    5—All 4 packets are MPE-FEC packets.

If Diff=1, all packets are SI/PSI and the first packet in the FIFO buffer 600 (of FIGS. 6A and 6B) is marked as mismatched. If Diff=2, there is only one MPE-FEC packet, so the four packets are sorted according to the number of mismatched bits in the PID. If the first packet has a number of mismatched bits not greater than a first lowest value, it is marked as matched, else it is marked as mismatched.

If Diff=3, there are two MPE-FEC packets, so the four packets are sorted according to the number of mismatched bits in the PID. If the first packet has a number of mismatched bits not greater than a second lowest value, it is marked as matched, else it is marked as mismatched. If Diff=4, there are three MPE-FEC packets, so the 4 packets are sorted according to the number of mismatched bits in the PID and if the first packet has number of mismatched bits not greater than a third lowest value, it is marked as matched, else it is marked as mismatched.

If Diff=5, all packets are MPE-FEC packets so the first packet is marked as matched. If Diff>5, the decision is taken based on the PID only, and the algorithm proceeds to the reset state. FIG. 7D illustrates other embodiments in which the position of the first packets is 9, 4, 3, and 2 and various values of the difference ranging from 1 to the value of the position for which the decision of step 742 may be made in a similar manner as discussed in the embodiment in which Pos=5. Again referring to FIG. 7E, in both cases of whether there is a sequence of packets having a valid CC sequence or not, the FIFO buffer 600 (of FIGS. 6A and 6B) is updated in step 744, and it is determined whether a number of packets having a number of mismatched bits less than the first threshold value is greater than half of a size of the FIFO buffer 600 (of FIGS. 6A and 6B) in step 746.

If the number of packets having the number of mismatched bits less than the first threshold value is greater than half of the size of the FIFO buffer 600 (of FIGS. 6A and 6B) (YES), then the run algorithm state is repeated as shown in step 748, and if less than half of the size of the FIFO buffer 600 (of FIGS. 6A and 6B) (NO), then the reset state is repeated from the start as shown in step 750.

Figure 8:
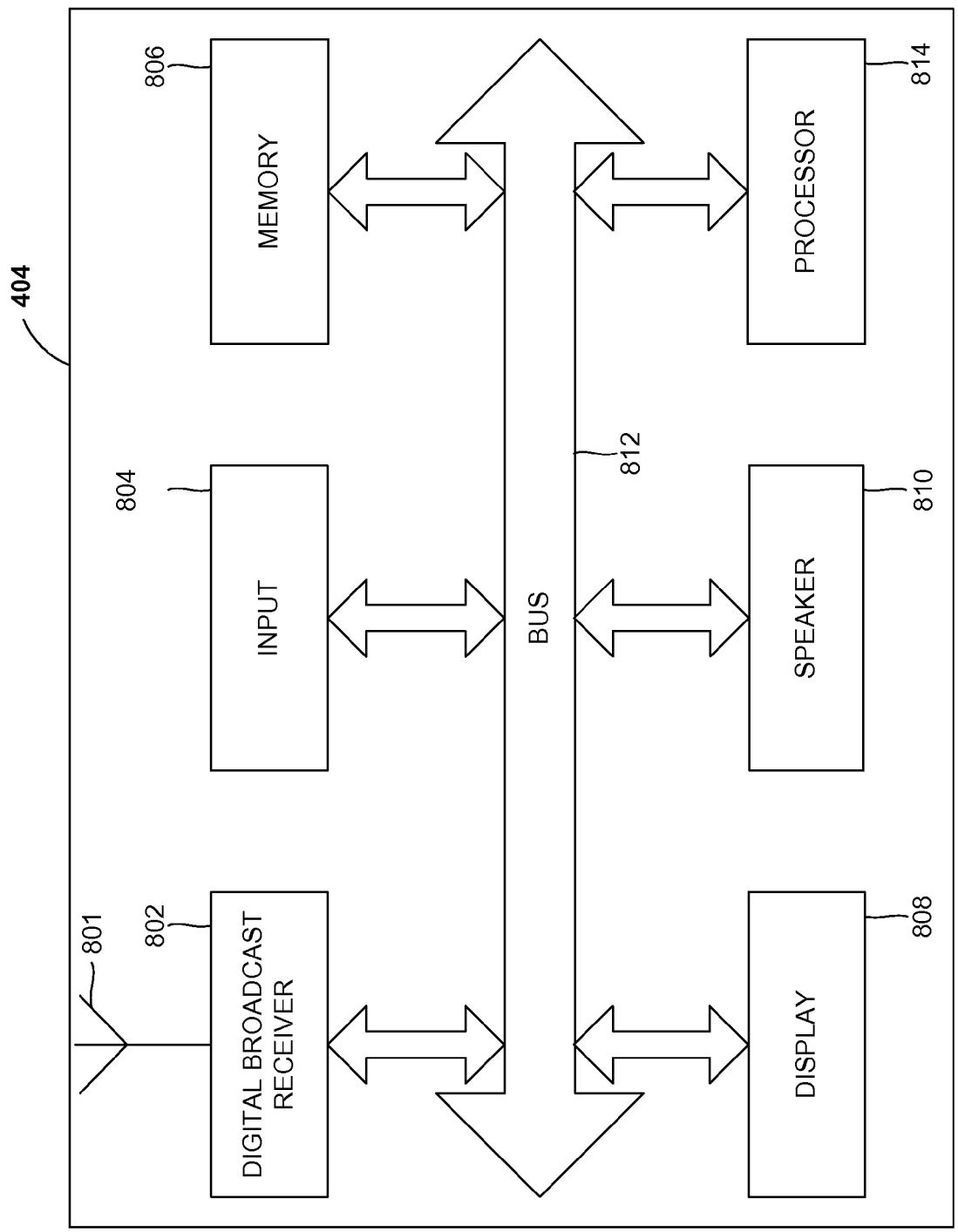
FIG. 8 is a schematic diagram illustrating the mobile terminal of FIG. 4 having an antenna, a digital broadcast receiver, an input, a memory having a set of instructions, a display, a speaker, a bus, and a processor capable of processing a set of instructions to perform any one or more of the methodologies herein according to an embodiment herein.

FIG. 8 illustrates the mobile terminal 404 of FIG. 4 having an antenna 801, a digital broadcast receiver 802, an input 804, a memory 806 having a computer set of instructions, a display 808, a speaker 810, a bus 812, and a processor 814 capable of processing a set of instructions to perform any one or more of the methodologies herein, according to an embodiment herein. Mobile terminal 404 may include digital broadcast receiver 802, which may include antenna 801.

Radio signals transmitted by broadcast network 400 are received via antenna 801 and passed to digital broadcast receiver 802. Digital broadcast receiver 802 may decode consumable digital content from the received signals. Digital content may additionally or alternatively be decoded by processor 814. Processor 814 may also enable digital content to be consumed in the form of video for output via one or more displays 808 or audio for output via speaker and/or earphones 810. Processor 814 may also carry out the methods described herein and in accordance with the embodiments herein. Digital content may also be stored in memory 806 for future processing or consumption. Memory 806 may also store program specific information and/or service information (PSI/SI), including information about digital content available in the future or stored from the past.

A user of mobile terminal 404 may view this stored service information on display 808 and select an item of digital content for viewing, listening, or other uses via input 804, which may take the form of a keyboard, keypad, scroll wheel, or other input device(s) or combinations thereof. When digital content is selected, processor 814 may pass information to receiver 802, so that the receiver may act appropriately (e.g., tune a radio or filter signals based on PSI/SI in order to yield specific digital content for the user). Service information may be encoded within the same digital bursts which deliver other forms of digital content to mobile terminal 404. Digital content and PSI/SI may be passed among functions within mobile terminal 404 using bus 812.

Figure 9A:
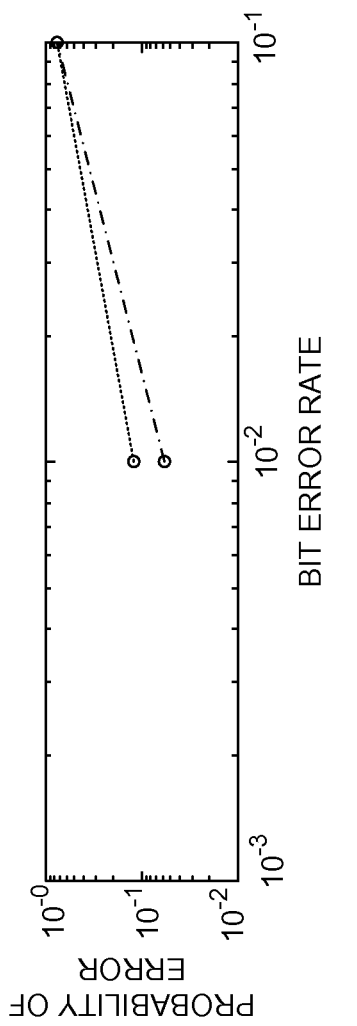
FIGS. 9A and 9B are graphical representations illustrating the probability of error and the probability of a false alarm versus the BER, respectively, comparing a conventional PID filter and a PID filter according to an embodiment herein, when the difference between the needed PID and the other PIDs is one bit, and the matching tolerance=0.
Figure 9B:
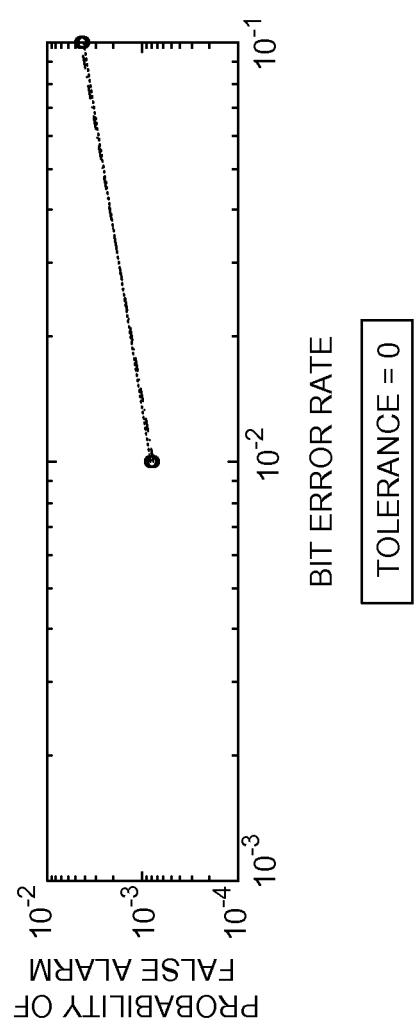

FIGS. 9A and 9B illustrate the probability of error and the probability of a false alarm versus the BER, respectively, comparing a conventional PID filter and a PID filter according to an embodiment herein, when the difference between the needed PID and the other PIDs is one bit, and the matching tolerance=0. In FIGS. 9A through 12B, the equally sized dotted line corresponds to the conventional PID filter, and the dot and dashed line corresponds to the PID filter according to the embodiments herein. Referring to FIG. 9A, the probability of error at a low BER for the PID filter according to the embodiments herein is lower than that of the conventional PID filter, with the difference in probability of error between the two being maximum at a BER of approximately $10^{-2}$. As the BER varies from $10^{-2}$ to $10^{-1}$, the difference in probability of error reduces, with the difference being zero at a BER of $10^{-1}$. Since in the conventional filter the decision is made only based on the difference between the needed PID and the other PIDs, which is greater than the matching tolerance in this case, the probability of error is higher. As shown in FIG. 9B, the probability of a false alarm for both filters is approximately the same throughout the range shown.

Figure 10A:
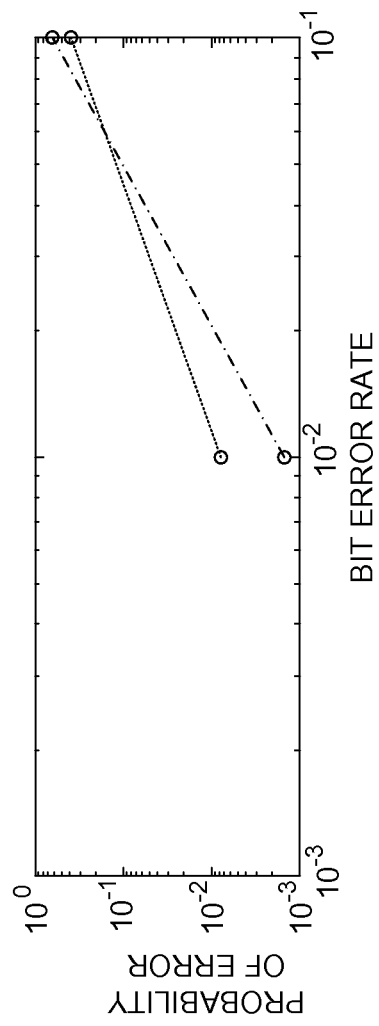
FIGS. 10A and 10B are graphical representations illustrating the probability of error and the probability of a false alarm versus the BER, respectively, comparing a conventional PID filter and a PID filter according to an embodiment herein, when the difference between the needed PID and the other PIDs is two bits, and the matching tolerance=1.
Figure 10B:
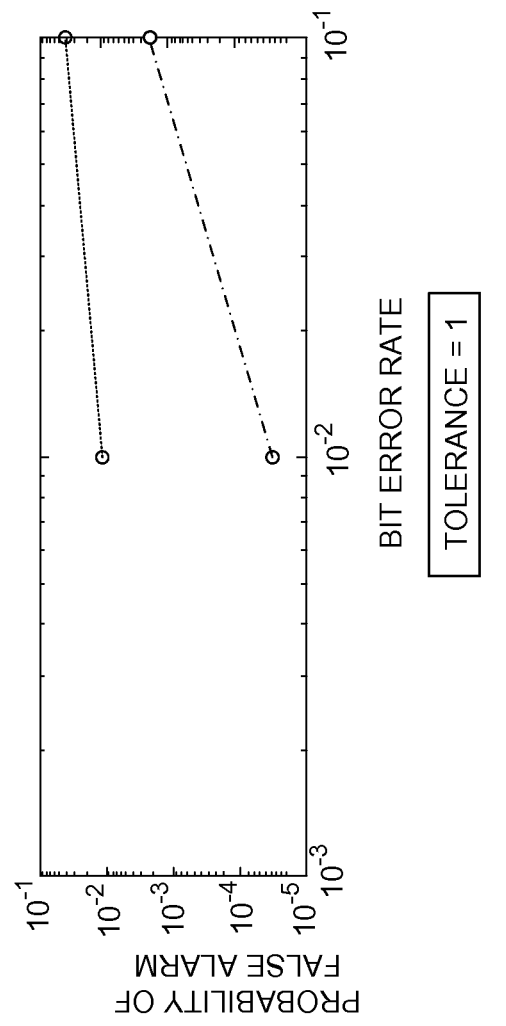

FIGS. 10A and 10B illustrate the probability of error and the probability of a false alarm versus the BER, respectively, comparing a conventional PID filter and a PID filter according to the embodiments herein, when the difference between the needed PID and the other PIDs is two bits, and the matching tolerance=1. Referring to FIG. 10A, the probability of error at a low BER for the PID filter according to the embodiments herein is lower than that of the conventional PID filter, with the difference in the probability of error between the two being maximum at a BER of approximately $10^{-2}$. As the BER varies from $10^{-2}$ to $10^{-1}$, the difference in probability of error reduces until it becomes zero.

For a higher BER, the probability of error is less for the conventional PID filter to a small extent. However, as shown in FIG. 10B, the probability of a false alarm of the conventional PID filter is higher throughout the range, with the difference in the probability of a false alarm being nearly three orders of magnitude at a BER of $10^{-2}$, and more than one order of magnitude when the BER is $10^{-1}$. Thus, in this case, the PID filter described herein reduces the probability of false alarm to a large extent throughout the range and displays a probability of error lower than the conventional PID filter for most of the range.

Figure 11A:
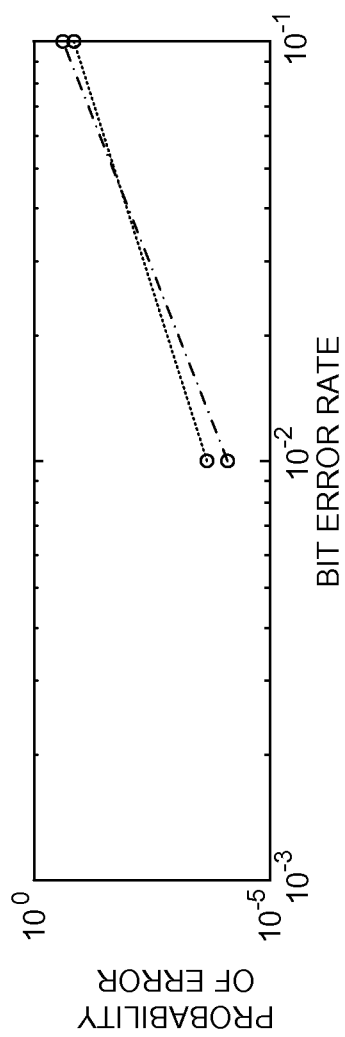
FIGS. 11A and 11B are graphical representations illustrating the probability of error and the probability of a false alarm versus the BER, respectively, comparing a conventional PID filter and a PID filter according to an embodiment herein, when the difference between the needed PID and the other PIDs is three bits, and the matching tolerance=2.
Figure 11B:
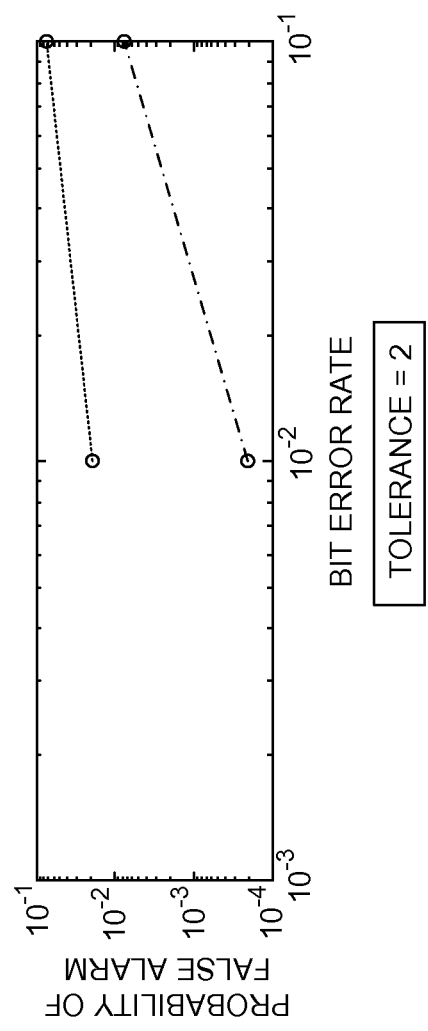

FIGS. 11A and 11B illustrate the probability of error and the probability of a false alarm versus the BER, respectively, comparing a conventional PID filter and a PID filter according to the embodiments herein, when the difference between the needed PID and the other PIDs is three bits, and the matching tolerance=2. Referring to FIG. 11A, the probability of error at low BER for the PID filter according to the embodiments herein is lower than that of the conventional PID filter, with the difference in the probability of error between the two being maximum at a BER of approximately $10^{-2}$. As the BER varies from $10^{-2}$ to $10^{-1}$, the difference in the probability of error reduces until it becomes zero.

For a higher BER, the probability of error is less for the conventional PID filter to a small extent. However, as shown in FIG. 11B, the probability of a false alarm of the conventional PID filter is higher throughout the range, with the difference in the probability of the false alarm being nearly two orders of magnitude at a BER of $10^{-2}$, and approximately one order of magnitude when the BER is $10^{-1}$. Thus, in this case, the PID filter provided by the embodiments herein reduces the probability of a false alarm to a large extent throughout the range (e.g., but not as much as in the case of FIG. 10B) and displays a probability of error lower than the conventional PID filter for most of the range.

FIGS. 12A and 12B illustrate the probability of error and the probability of a false alarm versus the BER, respectively, comparing a conventional PID filter and a PID filter according to the embodiments herein, when the difference between the needed PID and the other PIDs is four bits, and the matching tolerance=3. Referring to FIG. 12A, the probability of error at a low BER for the PID filter according to the embodiments herein is higher than that of the conventional PID filter, with the difference in the probability of error between the two being minimum at a BER of approximately $10^{-2}$. As the BER varies from $10^{-2}$ to $10^{-1}$, the difference in the probability of error increases slightly with the difference being a maximum at a BER of $10^{-1}$. However, as shown in FIG. 12B, the probability of a false alarm of the conventional PID filter is higher throughout the range, with the difference in the probability of false alarm being nearly two orders of magnitude for most of the range.

In this case, the PID filter provided by the embodiments herein reduces the probability of a false alarm to a large extent throughout the range and displays a probability of error slightly higher than the conventional PID filter throughout the range. Thus, the overall accuracy of the MPE-FEC table (considering the probability of error as well as the probability of a false alarm) in the case of the PID filter provided by the embodiments herein is improved as compared to the conventional PID filters, with the best results being obtained when the difference between the needed PID and the other PIDs is two bits, and the matching tolerance=1, as shown in FIGS. 10A and 10B, particularly at a BER of approximately $10^{-2}$.

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein include both hardware and software elements. Preferably, the software embodiments include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
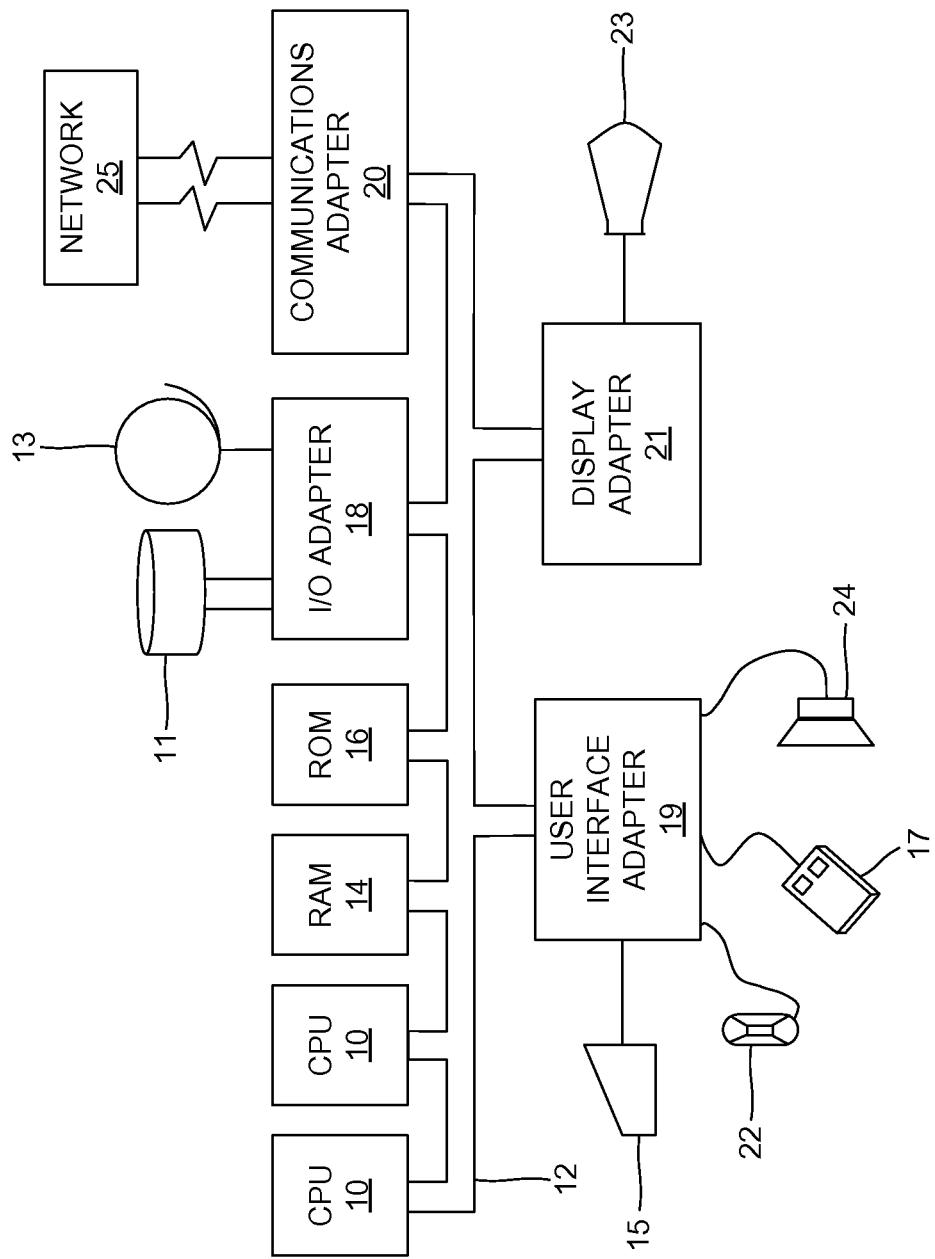
FIG. 13 is a schematic diagram illustrating a computer system according to an embodiment herein.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein take the decision on PID filtering based on the current packet as well the next M packets using a FIFO buffer 600 of size M. Further, a continuity counter (e.g., 4 bit field that is incremented by one every packet) is used in conjunction with the PID field to perform the decision on whether or not a packet is matched. PID filter is the most important step because losing any packet or taking an extra packet may cause shifting to the data in the MPE-FEC table which cause total failure in the MPE-FEC RS decoder. The embodiments herein decrease the probability of errors as well as the probability of false alarm. Moreover, the method of PID filtering provided by the embodiments herein is particularly advantageous to accurately construct the MPE-FEC table in a Digital Video Broadcasting transport stream.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

For example, the various methods, processes, operations, techniques, algorithms, etc. described herein may be enabled and operated using hardware circuitry (e.g., CMOS based logic circuitry, ASIC, FPGA), hardware/software partitioning, firmware, software and/or any combination of hardware, firmware, and/or software embodied in a machine readable medium and/or a machine accessible medium compatible with a data processing system (e.g., a computer system, a processor in a mobile terminal), and may be performed in any order. Accordingly, the specification and drawings are to be regarded in an illustrative rather than a restrictive sense.

What is claimed is:

1. A method of performing packet identifier (PID) filtering of a digital video broadcasting-handheld (DVB-H) transport stream, said method comprising steps of:
   processing a PID and a continuity counter (CC) sequence of said DVB-H transport stream, wherein said DVB-H transport stream comprises a M number of data packets;
   buffering a first-in-first-out (FIFO) queue of said DVB-H transport stream with said PID and said CC sequence;
   computing a number of mismatched bits between said PID and a desired PID;
   providing a single FIFO buffer;
   proceeding to a start of a reset state on said FIFO queue of said DVB-H transport stream when said FIFO buffer becomes full;
   determining if a number of mismatched bits of a first packet in said FIFO buffer is less than a first threshold value;
   determining whether there is a valid CC sequence that includes said first packet, only if said number of mismatched bits is less than said first threshold value;
   proceeding to a start of a run algorithm state only if said number of mismatched bits of said first packet in said FIFO buffer is less than said first threshold value and if there is a valid CC sequence that includes said first packet;
   marking said first packet as matched;
   updating a LAST CC value with a CC value of said first packet if there is a valid CC sequence; and
   performing the processing through the updating steps on a mobile digital broadcast receiver,
   wherein a size of said FIFO buffer is equal to said M number of data packets.

2. The method of claim 1, further comprising:
   marking said first packet as mismatched;
   updating said FIFO buffer; and
   returning to said start of said reset state if said number of mismatched bits of said first packet in said FIFO buffer is not less than said first threshold value.

3. The method of claim 1, further comprising:
   determining whether said packet is matched based only on said PID by comparing said number of mismatched bits in said FIFO buffer with a second threshold value;
   updating said FIFO buffer; and
   returning to said start of said reset state if there is no valid CC sequence.

4. A method of performing packet identifier (PID) filtering of a digital video broadcasting-handheld (DVB-H) transport stream, said method comprising steps of:
   processing a PID and a continuity counter (CC) sequence of said DVB-H transport stream;
   providing a single first-in-first-out (FIFO) buffer;
   buffering a FIFO queue of said DVB-H transport stream with said PID and CC sequence until said FIFO buffer is full;
   computing a number of mismatched bits between said PID and a desired PID;
   proceeding to a start of a reset state when said FIFO buffer becomes full;
   determining if a number of mismatched bits of a first packet in said FIFO buffer is less than a first threshold value;
   determining if there is a valid CC sequence, if said number of mismatched bits of said first packet in said FIFO buffer is less than said first threshold value;
   marking said first packet as matched;
   updating a LAST_CC value with a CC value of said first packet;
   updating said FIFO buffer if there is a valid CC sequence;
   proceeding to a start of a run algorithm state only if said number of mismatched bits of said first packet in said FIFO buffer is less than said first threshold value and if there is a valid CC sequence;
   determining if a first packet in said FIFO buffer has a number of mismatched bits greater than said first threshold value;
   computing a difference between a CC value of said first packet and said LAST_CC value if said first packet in said FIFO buffer has a number of mismatched bits not greater than said first threshold value; and
   performing the processing through the computing steps on a mobile phone.

5. The method of claim 4, wherein said method further comprises:
   determining if the first three packets in said FIFO buffer have a valid CC sequence if said first packet in said FIFO buffer has a number of mismatched bits greater than said first threshold value;
   marking a first packet in said FIFO buffer as matched or mismatched based on whether said first three packets in said FIFO buffer have a valid CC sequence; and
   updating said FIFO buffer and returning to said start of said run algorithm state.

6. The method of claim 4, wherein said method further comprises:
   marking said first packet as matched; and
   incrementing said LAST_CC value, if said difference between said CC value of said first packet and said LAST_CC value is equal to 1.

7. The method of claim 4, wherein said method further comprises determining whether there is a sequence of packets having a valid CC sequence if said difference between said CC value of said first packet and said LAST_CC value is not equal to 1.

8. The method of claim 7, wherein said method further comprises:
obtaining a position of a first packet in said first sequence of packets having a valid CC sequence; and
computing a difference between a CC value of said first packet in said first sequence of packets having a valid CC sequence and a LAST_CC value if there is a sequence of packets having a valid CC sequence.

9. The method of claim 7, wherein said method further comprises determining whether said packet is matched based only on said PID by comparing said number of mismatched bits in said FIFO buffer with a second threshold value and updating said FIFO buffer if there is no valid CC sequence.

10. The method of claim 8, wherein said method further comprises determining whether a packet in said FIFO buffer is matched based on said position of a first packet in said first sequence of packets having a valid CC sequence and said difference between said CC value of said first packet in said first sequence of packets having a valid CC sequence and said LAST_CC value.

11. The method of claim 9, wherein said method further comprises:
determining whether a number of packets having a number of mismatched bits less than said first threshold value is greater than half of a size of said FIFO buffer;
returning to said run algorithm state if said number of packets having said number of mismatched bits less than said first threshold value is greater than half of said size of said FIFO buffer; and
returning to said reset state if said number of packets having said number of mismatched bits less than said first threshold value is not greater than half of said size of said FIFO buffer.

12. A method comprising steps of:
receiving a video transport stream, wherein said transport stream comprises a M number of data packets;
storing the received video transport stream;
performing packet identifier (PID) filtering of said transport stream;
buffering said transport stream in a single first-in-first-out (FIFO) buffer;
processing a PID and a continuity counter (CC) sequence of said transport stream;
buffering a FIFO queue of said transport stream with said PID and said CC sequence until said FIFO buffer is full;
computing a number of mismatched bits between said PID and a desired PID;
proceeding to a start of a reset state when said FIFO buffer becomes full;
determining if a number of mismatched bits of a first packet in said FIFO buffer is less than a first threshold value;
determining if there is a valid CC sequence, if said number of mismatched bits of said first packet in said FIFO buffer is less than said first threshold value;
marking said first packet as matched;
updating a LAST_CC value with a CC value of said first packet;
updating said FIFO buffer if there is a valid CC sequence;
proceeding to a start of a run algorithm state only if said number of mismatched bits of said first packet in said FIFO buffer is less than said first threshold value and if there is a valid CC sequence;
determining if a first packet in said FIFO buffer has a number of mismatched bits greater than said first threshold value;
computing a difference between a CC value of said first packet and said LAST_CC value if said first packet in said FIFO buffer has a number of mismatched bits not greater than said first threshold value; and
performing the receiving through the computing steps on a digital broadcast television receiver,
wherein a size of said FIFO buffer is equal to said M number of data packets.

13. The method of claim 12, further comprising:
determining if the first three packets in said FIFO buffer have a valid CC sequence if said first packet in said FIFO buffer has a number of mismatched bits greater than said first threshold value;
marking a first packet in said FIFO buffer as matched or mismatched based on whether said first three packets in said FIFO buffer have a valid CC sequence; and
updating said FIFO buffer and returning to said start of said run algorithm state.

14. The method of claim 12, further comprising:
marking said first packet as matched; and
incrementing said LAST_CC value, if said difference between said CC value of said first packet and said LAST_CC value is equal to 1.

15. The method of claim 12, further comprising determining whether there is a sequence of packets having a valid CC sequence if said difference between said CC value of said first packet and said LAST_CC value is not equal to 1.

16. The method of claim 15, further comprising:
obtaining a position of a first packet in said first sequence of packets having a valid CC sequence; and
computing a difference between a CC value of said first packet in said first sequence of packets having a valid CC sequence and a LAST_CC value if there is a sequence of packets having a valid CC sequence.

17. The method of claim 15, further comprising determining whether said packet is matched based only on said PID by comparing said number of mismatched bits in said FIFO buffer with a second threshold value and updating said FIFO buffer if there is no valid CC sequence.

18. The method of claim 16, further comprising determining whether a packet in said FIFO buffer is matched based on said position of a first packet in said first sequence of packets having a valid CC sequence and said difference between said CC value of said first packet in said first sequence of packets having a valid CC sequence and said LAST_CC value.

* * * * *